US009723523B2

(12) United States Patent
Purnadi et al.

(10) Patent No.: US 9,723,523 B2
(45) Date of Patent: Aug. 1, 2017

(54) MAINTAINING MBMS CONTINUITY

(75) Inventors: Rene Purnadi, Irving, TX (US); Zhijun Cai, Euless, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 895 days.

(21) Appl. No.: 13/566,766

(22) Filed: Aug. 3, 2012

(65) Prior Publication Data
US 2014/0036676 A1 Feb. 6, 2014

(51) Int. Cl.
*H04W 36/00* (2009.01)
*H04W 76/00* (2009.01)
*H04W 36/22* (2009.01)
*H04W 48/20* (2009.01)

(52) U.S. Cl.
CPC ..... *H04W 36/0055* (2013.01); *H04W 76/002* (2013.01); *H04W 36/22* (2013.01); *H04W 48/20* (2013.01)

(58) Field of Classification Search
CPC .......... H04W 36/0055; H04W 76/002; H04W 48/20; H04W 36/22
See application file for complete search history.

(56) References Cited

U.S. PATENT DOCUMENTS

| | | | | |
|---|---|---|---|---|
| 6,633,543 B1 * | 10/2003 | Storr | ................... | H04L 12/5601 370/236.1 |
| 8,238,249 B2 * | 8/2012 | Kazmi | ................. | H04L 12/5695 370/237 |
| 2006/0023652 A1 * | 2/2006 | Vedantham | ......... | H04L 12/1868 370/312 |
| 2012/0236776 A1 * | 9/2012 | Zhang | ................... | H04W 48/12 370/312 |
| 2013/0083715 A1 * | 4/2013 | Etemad | ................. | H04W 52/04 370/312 |
| 2013/0107790 A1 * | 5/2013 | Lee | ......................... | H04W 4/06 370/312 |
| 2013/0142054 A1 * | 6/2013 | Ahmadi | ........................ | 370/252 |
| 2013/0322325 A1 * | 12/2013 | Hahn | ................ | H04W 36/0055 370/315 |

OTHER PUBLICATIONS

Alcatel-Lucent; "RAN3 Topics to Complete MBMS Service Continuity Feature"; 3GPP TSG-RAN WG3 Meeting #76 (R3-121047); Prague, Czech Republic; May 21-25, 2012; 2 pages.*
Catt; "MBMS Congestion Handling"; 2GPP TSG RAN WG2 Meeting #77 (R2-120778); Dresden, Germany; Feb. 6-10, 2012; 2 pages.*

(Continued)

*Primary Examiner* — Andrew Lai
*Assistant Examiner* — Chuong M Nguyen
(74) *Attorney, Agent, or Firm* — Fish & Richardson P.C.

(57) ABSTRACT

Methods and systems for managing Multimedia Broadcast Multicast Service (MBMS) service continuity include, with a source node in a communication system, providing an MBMS, processing an event that indicates that a User Equipment (UE) being serviced by the source node is to be transferred to one of a number of candidate nodes, receiving a congestion bit from each of the candidate nodes, and providing data to the UE that causes the UE to be serviced by a target node selected from the candidate nodes based at least in part on values of the congestion bits from each of the candidate nodes.

48 Claims, 9 Drawing Sheets

(56) References Cited

OTHER PUBLICATIONS

Research in Motion UK Limited; "Further Assistance for MBMS Service Continuity"; 3GPP TSG WG2 Meeting #79 (R2-123877); Qingdao, China; Aug. 13-17, 2012; 2 pages.*
3GPP; ("Technical Specification Group Radio Access Network; Evolved Universal Terrestrial Radio Access (E-UTRA) and Evolved Universal Terrestrial Radio Access Network (E-UTRAN); Overall description; Stage 2 (Release 11)" published Dec. 2011.*
Ericsson; "MBMS autonomous frequency prioritization in idle mode"; Nov. 14, 2011.*
Ericsson et al.: "MBMS autonomous frequency prioritization in idle mode", 3GPP Draft; R2-116194, Mobile Competence Center; 650, Route Des Lucioles; F-06921 Sophia-Antipolis Cedex; France, vol. RAN WG2, San Francisco, USA; Nov. 10-14, 2011; sections 1 and 2.1.*
Alcatel-Lucent; "RAN3 Topics to Complete MBMS Service Continuity Feature"; 3GPP TSG-RAN WG3 Meeting #76 (R3-121047); Prague, Czech Republic; May 21-25, 2012; 2 pages.
Catt; "MBMS Congestion Handling"; 2GPP TSG RAN WG2 Meeting #77 (R2-120778); Dresden, Germany; Feb. 6-10, 2012; 2 pages.
Ericsson, ST-Ericsson; "MBMS Autonomous Frequency Prioritization in Idle Mode"; 3GPP TSG-RAN WG2 #76 (R2-116194); San Francisco, CA; Nov. 10-14, 2011; 3 pages.
Research in Motion UK Limited; "Further Assistance for MBMS Service Continuity"; 3GPP TSG WG2 Meeting #79 (R2-123877); Qingdao, China; Aug. 13-17, 2012; 2 pages.
International Search Report and Written Opinion of the International Searching Authority issued in International Application No. PCT/US2013/052997 on Jan. 7, 2014; 12 pages.

* cited by examiner

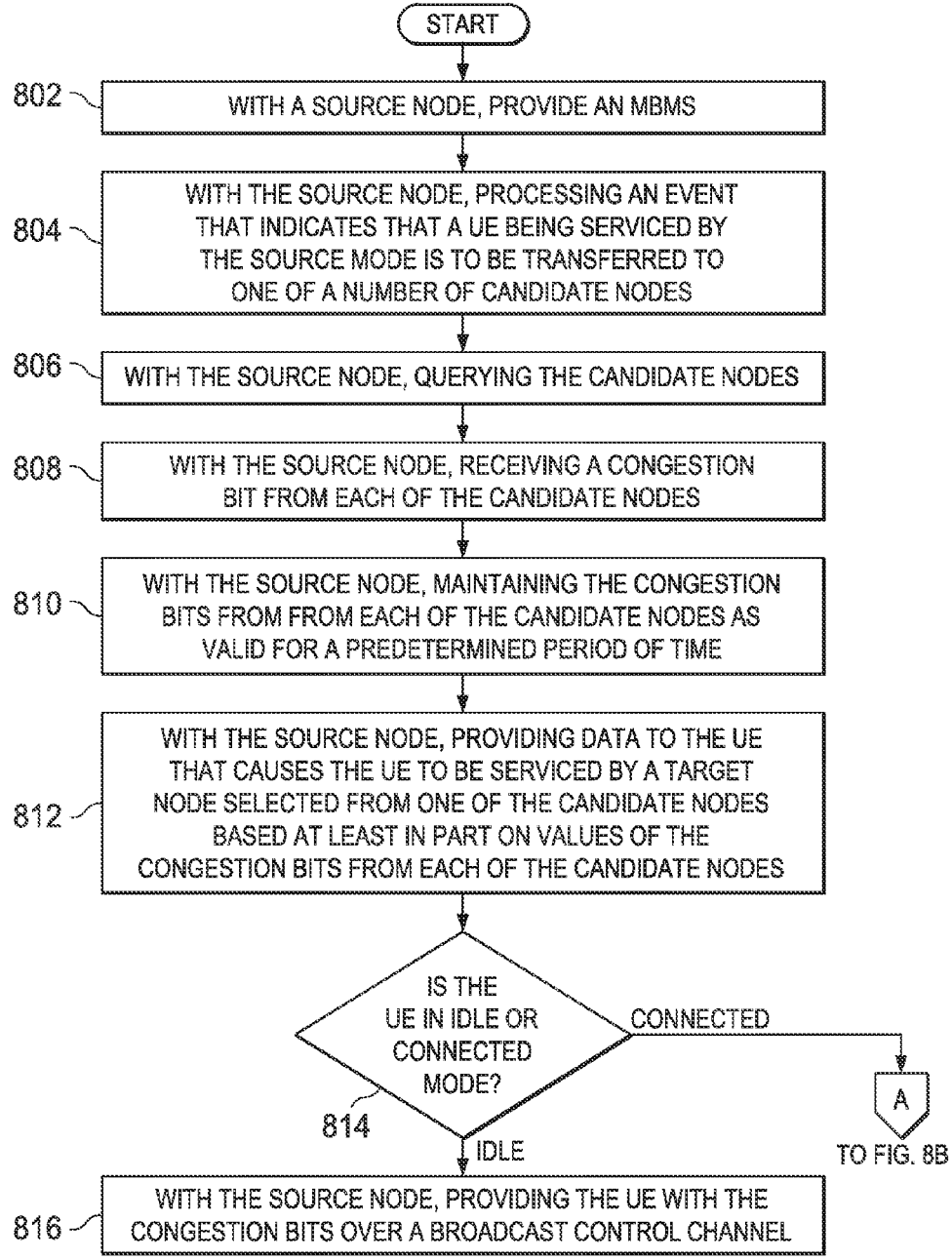

MAINTAINING MBMS CONTINUITY

FIELD

The present disclosure is directed to multimedia broadcast multicast service (MBMS), and more particularly to efficiently maintaining MBMS continuity in Radio Resource Controller (RRC) connected and RRC idle modes.

BACKGROUND

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, a relay, a remote radio head, or a similar component instead of or in addition to a traditional base station. Any such component may be referred to herein as an eNB, but it should be understood that such a component is not necessarily an eNB. Such a component may also be referred to herein as an access node or base station. Also, the terms "eNB" and "cell" might be used interchangeably herein. And likewise, the term eNB may refer to components of a eNB or other base station, access node, etc.

The following terms and abbreviations may be used throughout this disclosure:
ACK Acknowledgement
BCCH Broadcast Channel
BM-SC Broadcast Multicast Service Center
eNB enhanced Node B
CQI Channel Quality Indicator
CA Carrier Aggregation
DL-SCH Down Link Shared Channel
EPS Enhanced Packet Switch
ESA Emergency Service Announcement
HARQ Hybrid ARQ (Automatic Repeat reQuest)
HO Handover
LTE Long Term Evolution
M2AP M2 interface Application Protocol
M3AP M3 interface Application Protocol
MCCH MBMS Control Channel
MCH MBMS Channel
MCS Modulation Coding Scheme
MBMS Multimedia Broadcast Multicast Service
MBMS-GW MBMS Gateway
MBSFN MBMS Single Frequency Network
MME Mobility Management Entity
MSP MBMS Service Period
NACK Negative Acknowledgement
p-t-m point to multi-points
p-t-p point to point
RLC Radio Link Controller
RRC Radio Resource Controller
S1AP S1 interface Application Protocol
SAI Service Area Identifier
SINR Signal to Interference plus Noise Ratio
TMGI Temporary Multicast Group Identity
UE User Equipment
UM Unacknowledged Mode
X2AP X2 interface Application Protocol

DESCRIPTION OF THE DRAWINGS

FIG. 8A is a flowchart showing an illustrative method for MBMS continuity, according to one example of principles described herein.

DETAILED DESCRIPTION

Figure 1A:
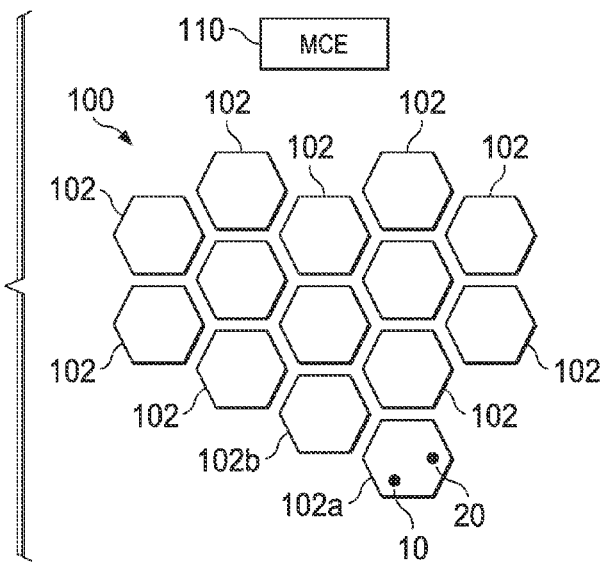
FIG. 1A is a schematic diagram of an example network according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure includes systems, methods, and network elements that can specify mechanisms to facilitate the network to provide continuity of the service(s) provided by MBSFN in deployment scenarios involving one or more frequencies, to specify cell selection/reselection mechanisms in order to facilitate the UE to receive the desired MBMS service(s) in RRC Idle mode, to specify the signaling mechanisms to facilitate the network to provide continuity of the desired MBMS service(s) reception in RRC Connected mode, to provide the related MCE functionality for the above mechanisms, and to study and specify some approaches for introducing location information relevant to a service so the UE may select, whether or not to receive and decode a service.

Services that might be provided by LTE-based equipment can include broadcasts or multicasts of television programs, streaming video, streaming audio, and other multimedia content. Such services are commonly referred to as multimedia broadcast multicast services (MBMS). An MBMS might be transmitted throughout a single cell or throughout several contiguous or overlapping cells in the same or different carriers. When multiple cells overlap, a UE within the overlapped region can receive transmissions from multiple eNBs. When a UE receives substantially identical data from a plurality of eNBs, the transmissions from the eNBs can augment one another to provide a signal of significantly higher quality than would be the case if only one eNB were transmitting the signal. That is, a higher signal-to-interference-plus-noise ratio can be achieved when substantially the same data is transmitted at substantially the same time on substantially the same resource with substantially the same modulation and coding. A set of cells in which a plurality of substantially identical signals are present is known as a single frequency network, or SFN. If an MBMS is being transmitted with substantially identical signals in a set of cells, the set of cells can be referred to a multicast/broadcast SFN (MBSFN).

The aim of MBMS service continuity is to allow a network to direct a UE that is receiving or interested to receive a MBMS session in RRC Connected mode to a target cell where the UE can receive or continue to receive the same MBMS session, and for UE in RRC Idle mode to select/reselect a cell where the UE can receive or continue to receive the desired MBMS service. The analysis above indicates that a "perfect" MBMS service continuity, either through handover in RRC Connected mode or cell reselection in RRC Idle mode can only occur if the target cell is within the same MBSFN area.

According to certain illustrative embodiments, a method for managing Multimedia Broadcast Multicast Service (MBMS) service continuity includes, with a source node in a communication system, providing an MBMS, processing an event that indicates that a User Equipment (UE) being serviced by the source node is to be transferred to one of a number of candidate nodes, receiving a congestion bit from each of the candidate nodes, and providing data to the UE that causes the UE to be serviced by a target node selected from the candidate nodes based at least in part on values of the congestion bits from each of the candidate nodes.

In some examples, one of the congestion bits from one of the candidate nodes may indicate whether that candidate node can provide a non-MBMS service to an additional device. The non-MBMS service may include a unicast service. If the UE is in a Radio Resource Controller (RRC) idle mode, then the source node may also provide the UE with the congestion bits over a broadcast control channel associated with the MBMS. The UE may then select the target node based at least in part on the values of the congestion bits and a priority maintained by the UE.

If the UE is in an RRC connected mode, the source node may receive a priority bit from the UE. The priority bit can indicate whether the UE prioritizes MBMS. The source node may then select the target node based at least in part on a value of the priority bit and the values of the congestion bits. If the priority bit indicates that the UE prioritizes MBMS, to select the target node, the source node may select a candidate node having a stronger signal than other candidate nodes, the signal strength being above a predefined threshold for MBMS. If the priority bit indicates that the UE does not prioritize MBMS, then selecting the target node includes selecting a candidate node with an available non-MBMS service and stronger signal strength than other candidate nodes, the signal strength being above a predefined threshold for the non-MBMS service.

In some examples, the priority bit is received by the source node in a measurement report sent by the UE. The congestion bit may be received as part of an MBMS query response, a handover command, or a handover request ACK. The source node may narrow the candidate nodes to those that provide an MBMS service on a same single frequency network of the source node.

In some examples, the source node may send the congestion bit of the selected target node to the UE to inform the UE whether the UE can receive a non-MBMS service from the target node. The congestion bit may be sent to the UE in an RRC Connection Reconfiguration message.

In some examples, receiving the congestion bits may be in response to a query sent by the source node to the candidate nodes. The source node may maintain the congestion bit from each of the candidate nodes as valid for a predefined period of time.

According to certain illustrative examples, a source node within a communication network includes a processor and a computer readable medium comprising a set of computer readable instructions. The computer readable instructions, when executed by the processor, cause the node to provide a Multimedia Broadcast Multicast Service (MBMS), process an event that indicates that a User Equipment (UE) being serviced by the source node is to be transferred to one of a number of candidate nodes, receive a number of congestion bits from each of the candidate nodes, and provide data to the UE that causes the UE to be serviced by a target node selected from the candidate nodes based at least in part on values of the congestion bits from each of the candidate nodes.

According to certain illustrative examples, a method for managing Multimedia Broadcast Multicast Service (MBMS) service continuity includes, with a User Equipment being serviced by a source node in a communication system, receiving an MBMS, sending a signal to the source node that indicates that the UE is to be transferred to one of a number of candidate nodes, receiving a signal that causes the UE to be serviced by a target node selected from the candidate nodes, the target node being selected based at least in part on values of a number of congestion bits received by the source node from the candidate nodes.

According to certain illustrative examples a User Equipment (UE) being serviced by a source node within a communication network, includes a processor and a computer readable medium comprising a set of computer readable instructions. The computer readable instructions, when executed by the processor, cause the UE to receive an MBMS, send a signal to the source node that indicates that the UE is to be transferred to one of a number of candidate nodes, and receive a signal that causes the UE to be serviced by a target node selected from the candidate nodes, the target node being selected based at least in part on values of a number of congestion bits received by the source node from the candidate nodes.

FIG. 1A is a schematic diagram of an exemplary network 100 according to an embodiment of the disclosure. The network 100 may include a plurality of cells 102. Each of the cells 102 represents a coverage area for providing wireless telecommunication services of the network 100 via an access node. In some cases, the cells 102 might be referred to by other names, such as "hotspots". While the cells 102 are depicted as having non-overlapping coverage areas, one or more of the cells 102 may have partially or completely overlapping coverage with adjacent cells. Further, while a particular number of the cells 102 are depicted, a larger or smaller number of the cells 102 may be included in the network 100.

One or more UEs 10 may be present in each of the cells 102. Although only one UE 10 is depicted and is shown only in cell 102*a*, a plurality of UEs 10 might be present in each of the cells 102. An eNB 20 in each of the cells 102 provides a radio link between the UEs 10 and other components in a telecommunications network. While the eNB 20 is shown only in cell 102a, it should be understood that an eNB would be present in each of the cells 102. Also, access nodes other than the eNBs 20 could be used. The eNBs 20 can communicate with an MBMS control entity (MCE) 110 or a similar network component that can provide centralized or distributed management and coordination among the eNBs 20. The term "UE" can also refer to any hardware or software component that can terminate a communication session for a user. Also, the terms "user equipment," "UE," "user agent," "UA," "user device," and "mobile device" might be used synonymously herein. As used herein, the terms "user equipment" or "UE" might in some cases refer to mobile devices such as mobile telephones, personal digital assistants, handheld or laptop computers, and similar devices that have telecommunications capabilities. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances.

Embodiments of the present disclosure facilitate MBMS service continuity for UEs 10 in the network 100. That is, a UE 10 that is receiving an MBMS transmission can continue receiving the MBMS transmission after moving to another cell. For example, the UE 10 in cell 102a might be receiving an MBMS transmission from the eNB 20 in that cell. If the UE 10 then moves to another cell, cell 102b for instance, the UE 10 can continue the MBMS reception that the UE 10 was receiving or was interested in receiving in cell 102a.

MBMS is a point to multipoint (p-t-m) service that allows data from a single source entity to be transmitted to multiple endpoints, using efficient radio resources. The data typically originates from a Broadcast Multicast Service Center (BM-SC) and is sent to one or more eNBs 20. The eNBs 20 may then transmit the data over the air interface to one or more UEs 10. The UE 10 can receive the content of the service substantially simultaneously using radio resources comparable to a unicast transmission to one user. In most cases, the MBMS transmission may be unidirectional, but in some cases, the MBMS transmission could be bi-directional. That is, in most cases, the UE 10 does not have an uplink radio bearer to transmit an acknowledgement/negative acknowledgement (ACK/NACK), to report channel quality (CQI), or to send other information on an uplink.

In certain implementations, such as LTE, the UE 10 receives the available MBMS services from information the UE receives in System Information Block type 13 (SIB13) in the broadcast channel (BCCH). SIB13 contains information to acquire the MBMS Control Channel (MCCH). Upon acquiring MCCH, the UE 10 obtains information about the available MBMS services, which carrier, which radio frames and the location of the MCH (MBMS Channel) subframes that carry MCCH change notification, MTCH (MBMS Traffic Channel) or MTCH with ESA (Emergency Service Announcement) content, and other info such as MCH Scheduling Period (MSP), MCS (Modulation and Coding Scheme) for MBMS, etc.

UE 10 can acquire the MCCH in the RRC Idle state or in the RRC Connected state. In certain implementations, such as UMTS, when a UE finds an MBMS service of interest, the UE can register to join a multicast service or can join a broadcast service without registering. A broadcast service typically requires no subscription while a multicast service typically requires a subscription. Through join and leave procedures, the BM-SC typically knows how many users are registering for a multicast service, and may activate and deactivate the service based on the number of users joining and leaving the service. In contrast, the BM-SC cannot keep track of the number of broadcast users. It should be noted, however, that joining an MBMS service is not necessarily an indication that a UE is receiving the MBMS multicast transmission. In addition, a procedure for counting users in the RRC connected state can help the BM-SC determine how many users in the MBSFN are interested in receiving or are already receiving an MBMS service. The results of the counting procedure can be used by the BM-SC to determine the activation, deactivation, and reactivation of an MBMS service that is being provided to all the cells in an MBSFN, rather than this information being provided on a per-cell basis. This counting procedure does not include UEs in the RRC Idle state.

Moreover, in certain implementations, such as in LTE, MBMS does not have join and leave procedures. As used herein, the term "MBMS service" or simply "MBMS" might refer to a multimedia broadcast or multicast that may be available in a cell but that may or may not be received by a UE in that cell. The term "MBMS session" might refer to a particular instance of an MBMS service that is actually being received by a UE.

A UE can have prior knowledge about MBMS services through USD (User Subscriber Data) previously (and electronically) sent to a subscriber (UE) by e.g., the application layer. The USD provides the MBMS service identity and the corresponding Service Area Identity or Identities (SAI(s)). SAI is territorial, for example New York metro area, assigned by the BM-SC. Cells that provide the MBMS service in that territory belong to the same SAI.

The UE, however, may not know the serving and neighboring cells SAI, therefore it does not know whether a certain MBMS service that the UE is receiving or interested to receive, is available in the serving and/or its neighboring cells. To check the availability of the MBMS service in the serving or neighboring cells, the UE must acquire the MCCH of the serving cell and/or the neighboring cell. This is not efficient, especially if the MBMS is provided at a difference carrier in a Carrier Aggregation (CA) environment.

Therefore in order to enable MBMS service and enable MBMS service continuity efficiently, it is beneficial if a UE can get some assistance in knowing the MBMS service that the serving and neighboring cells provide with its corresponding carriers. To assist the UE, an MBMS capable cell can broadcast its SAI (if the serving cell is a member of a SAI) and its neighboring cells' SAI (including small cells' SAI if the neighboring small cells provide MBMS service) with the corresponding frequency for the MBMS service, assigned by the radio access network. This broadcast requires MBMS information exchange over the backhaul, and allows the UE to switch only to a carrier that provides the corresponding MBMS service and to acquire the SIB13 and the MCCH of that carrier.

Figure 1B:
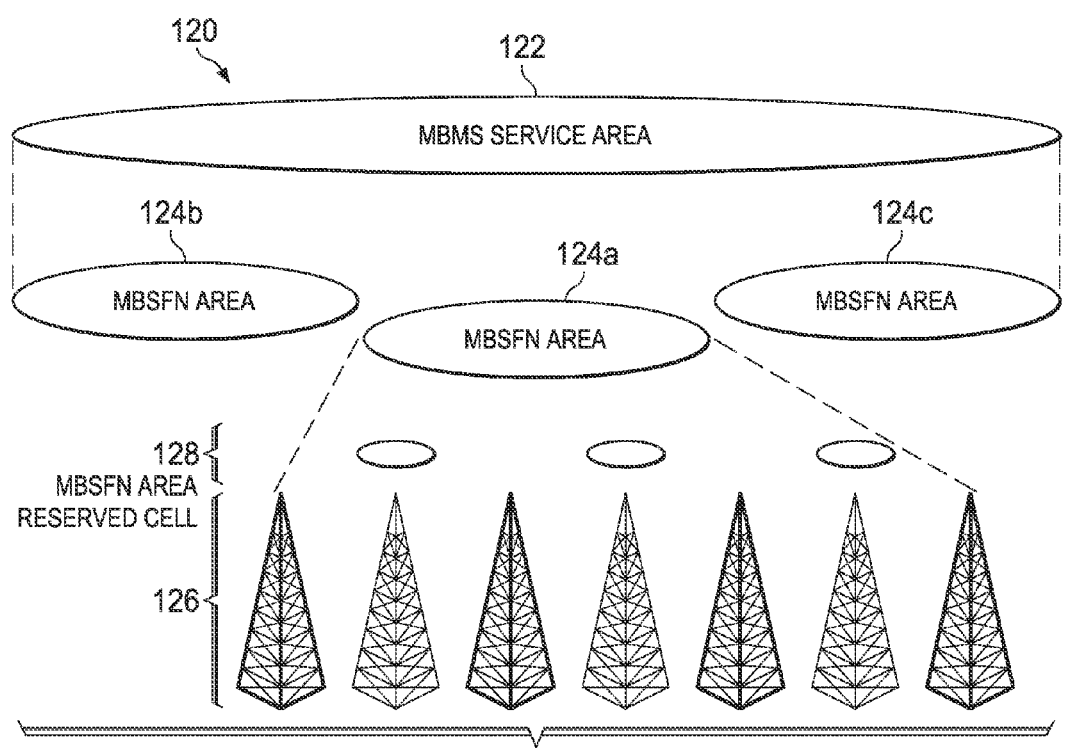
FIG. 1B is a schematic diagram of an example network showing a multimedia Broadcast Multicast Service (MBMS) Service Area.

MBMS and non-MBMS cells indicate for each neighbor frequency the list of MBMS SAIs. If the MBMS SAIs are provided in the system information (SI), the UE interested in a MBMS service is only allowed to prioritize other frequencies and indicate interest based on this information. An MBSFN Synchronization Area is an area of the network where all eNBs can be synchronized and perform MBSFN transmissions. MBSFN Synchronization Areas are capable of supporting one or more MBSFN Areas. On a given frequency layer, an eNB can only belong to one MBSFN Synchronization Area. MBSFN Synchronization Areas are independent from the definition of MBMS Service Areas. The definition of MBSFN Transmission is a simulcast transmission technique realized by transmission of identical waveforms at the same time from multiple cells. An MBSFN Transmission from multiple cells within the MBSFN Area is seen as a single transmission by a UE. An MBMS Service Area ID (SAI) identifies the MBMS service area where the MBMS service is available. FIG. 1B is a schematic diagram of an example network 120 showing a multimedia Broadcast Multicast Service (MBMS) Service Area 122. As shown in FIG. 1B, MBMS Service Area 122 can include of one or more MBSFN area 124a-c. A synchronized MBMS transmission is guaranteed only within one MBSFN area, and each cell (e.g., cell 128) that belongs to the same MBSFN area (e.g., MBSFN area 124a) carries the same MBMS service(s). That means the MBMS service continuity occurs when the UE moves to another cell within one MBSFN area. If the UE moves to another cell within one MBMS service area but in a different MBSFN area, the same MBMS service(s) is available but there is no guarantee that the MBMS transmission is in sync (even from the MBMS content level). An MBSFN synchronization area is an area where eNBs are synchronized for MBSFN transmission, and an eNB can only belong to one MBSFN synchronization area on one carrier or frequency layer. An MBSFN synchronization area can support more than one MBSFN areas. It means in a different carrier or frequency layer, an eNB will belong to a different MBSFN synchronization area, consequently it will be a different MBSFN area. A MBMS service is transmitted in sync within an MBSFN area.

Figure 1C:
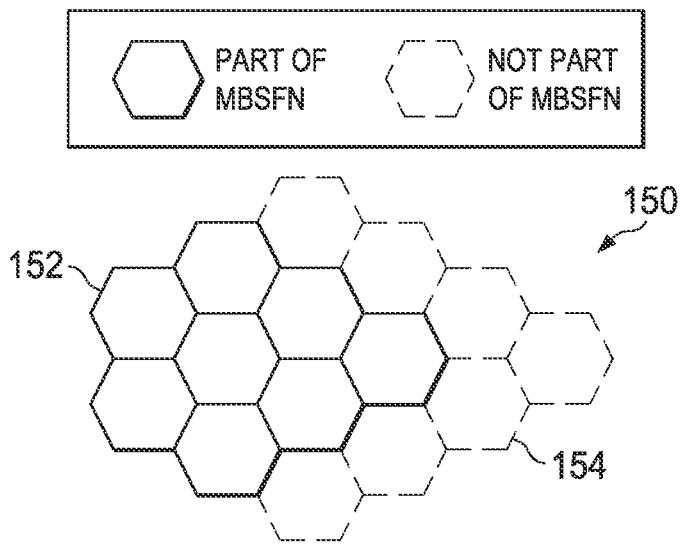
FIG. 1C is a schematic diagram of an example network showing Multicast Broadcast Single Frequency Network (MBSFN) cells and non-MBSFN cells.

FIG. 1C is a schematic diagram of an example network 150 showing Multicast Broadcast Single Frequency Network (MBSFN) cells 152 and non-MBSFN cells 154. The MBSFN can expand MBMS service to a plurality of cells. Such cells can synchronously transmit MBMS traffic using the same radio properties, and when the cells are adjacent to each other, a UE can combine the radio signals from neighboring cells and obtain a better SINR (Signal to Interference plus Noise Ratio). So the lack of an ACK/NACK and other issues mentioned above with regard to the unidirectional transmission mode for MBMS services are somewhat compensated for by the fact that the UE can combine radio signals from adjacent cells and thereby possibly receive fewer error frames. An MBSFN is identified by a field: MBSFN-AreaID in SIB13. An MBMS service area can include one or more MBSFN area. Because the synchronous transmission is guaranteed to occur only in cells within an MBSFN area, not within MBMS service area, a MBMS service continuity can only occur among cell within MBSFN area. If the target cell belongs to a different MBSFN, the MBMS service between the serving and the target cells may have a different start time and different radio properties, even when both cells belong to the same MBMS service area. Tolerating the different start time and adjusting the radio properties will allow (for what this disclosure refers to as) "imperfect" MBMS service continuity in a target cell within the same SAI but a different MBSFN.

As mentioned above, LTE does not have joining and leaving procedures similar to those in UMTS. This means an eNB may not have information about the MBMS services that a UE is actively receiving or is interested in receiving. When a UE is to be handed over from a serving cell to a target cell, the eNB determines which cell will be the target cell based on signal measurement reports from the UE. However, because the eNB in LTE systems does not maintain a UE's MBMS context, it has no information about the MBMS services that the UE is receiving or is interested in receiving, the eNB cannot adjust the handover decision to ensure that the UE will be handed over to a target cell where the MBMS services will continue to be available. That is, the eNB hands the UE over to the cell with the best signal quality, without regard to the MBMS services available in that cell. If an MBMS service that the UE is receiving in the serving cell is available in the target cell, the MBMS service might be continued in the target cell. However, if an MBMS service that the UE is receiving in the serving cell is not available in the target cell, the MBMS service might be dropped when the UE moves to the target cell.

Figure 2:
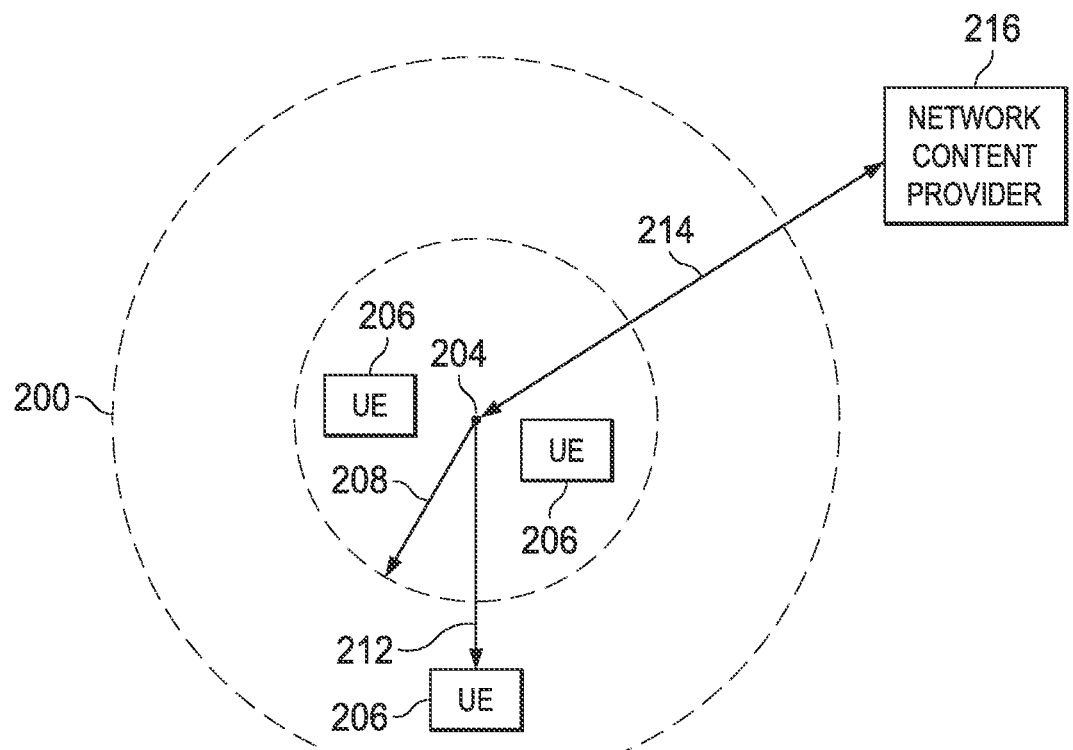
FIG. 2 is a schematic representation of an example heterogeneous wireless communication network.

FIG. 2 illustrates an exemplary cell 200 within the cellular network 100. The cell 200 includes an eNB 204 and a plurality of UE 206. The eNB 204 may receive a MBMS or other services through communication with a network content provider 216 over a backhaul network connection 214. Upon receiving the MBMS or other services, the eNB 204 may determine whether any of the UE 206 are interested in the MBMS or other services. While only three UE 206 are depicted within the cell 200, persons of ordinary skill in the art will recognize that there may be more or fewer UE 206 within the cell. Further, while the eNB 204 is shown to be in communication with one network content provider 216, persons of ordinary skill in the art will recognize that the eNB 204 may be in communication with a plurality of content providers.

The UE 206 may each operate in a connected state or an idle state with the eNB 204. The UE 206 in the connected state are in active communication with the eNB 204, whereas the UE 206 in the idle state may be in range of the eNB 204, but not in active communication. For the UE 206 in the connected state, the eNB 204 may easily determine how many UE 206 are currently using the MBMS or other services.

Figure 3:
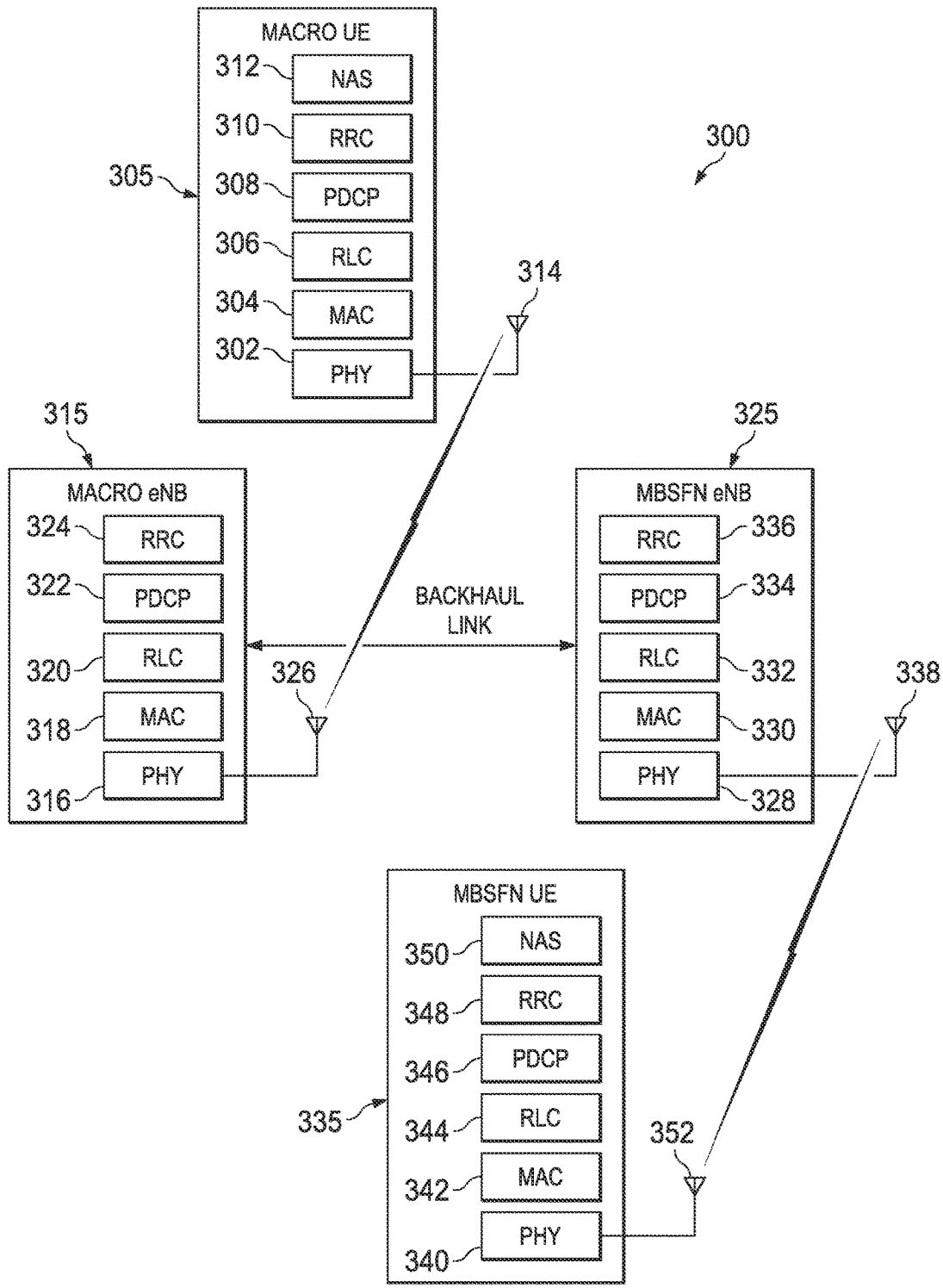
FIG. 3 is a schematic block diagram illustrating various layers of access nodes and user equipment in a wireless communication network.

FIG. 3 is a schematic block diagram 300 illustrating various layers of access nodes and user equipment in a wireless communication network. The illustrated system 300 includes a macro eNB 315, a MBSFN eNB 325 (i.e., an eNB that is part of a specific MBSFN) a macro UE 305, and a MBSFN UE 335 (i.e., a UE that is receiving data from a specific MBSFN). Here macro UE 305 and MBSFN UE 335 are UEs which are either actively communicating or camping on macro eNB 315 and MBSFN eNB 325 respectively. The macro eNB 315 and the MBSFN eNB 325 can be collectively referred to as a "network," "network components," "network elements," "access nodes," or "access devices." FIG. 3 shows only these four devices (alternatively, referred to as "apparatuses" or "entities") for illustrative purposes, and the system 300 can further include one or more of these devices without departing from the scope of this disclosure. The macro eNB 315 can communicate wirelessly with the macro UE 305. The MBSFN eNB 325 can communicate wirelessly with the MBSFN UE 335. The macro eNB 315 can communicate with the MBSFN eNB 325 via a backhaul link, for example, an X2 backhaul link, a wireless connection, or a combination thereof. In some implementations, the macro eNB 315 and MBSFN eNB 325 may exchange their transmission power levels via the backhaul link.

Each of the devices 305, 315, 325 and 335 includes a protocol stack for communications with other devices via wireless or wired connection. The macro eNB 315 can include a physical (PHY) layer 316, a medium access control (MAC) layer 318, a radio link control (RLC) layer 320, a packet data convergence protocol (PDCP) layer 322, and a radio resource control (RRC) layer 324. In the case of user plane communications for data traffic, RRC layer is not involved. The macro eNB 315 can also include one or more transmit and receive antennas 326 coupled to the PHY layer 316. In the illustrated implementation, a "PHY layer" can also be referred to as "layer 1." A MAC layer can also be referred to as "layer 2." The other layers (RLC layer, PDCP layer, RRC layer and above) can be collectively referred to as a "higher layer(s)."

Similarly, the MBSFN eNB 325 includes a PHY layer 328, a MAC layer 330, a RLC layer 332, a PDCP layer 334, and an RRC layer 336. The MBSFN eNB 325 can also include one or more antennas 338 coupled to the PHY layer 328.

The macro UE 305 can include a PHY layer 302, a MAC layer 304, a RLC layer 306, a PDCP layer 308, an RRC layer 310, and a non-access stratum (NAS) layer 312. The macro UE 305 can also include one or more transmit and receive antennas 314 coupled to the PHY layer 302. Similarly, the MBSFN UE 335 can include a PHY layer 340, a MAC layer 342, a RLC layer 344, a PDCP layer 346, an RRC layer 348, and a NAS layer 350. The MBSFN UE 335 can also include one or more transmit and receive antennas 352 coupled to the PHY layer 340.

Communications between the devices, such as between the macro eNB 315 and the macro UE 305, generally occur within the same protocol layer between the two devices. Thus, for example, communications from the RRC layer 324 at the macro eNB 315 travel through the PDCP layer 322, the RLC layer 320, the MAC layer 318, and the PHY layer 316, and are sent over the PHY layer 316 and the antenna 326 to the macro UE 305. When received at the antenna 314 of the macro UE 305, the communications travel through the PHY layer 302, the MAC layer 304, the RLC layer 306, the PDCP layer 308 to the RRC layer 310 of the macro UE 305. Such communications are generally done utilizing a communications sub-system and a processor, as described in more detail below.

In the implementations described in this disclosure, various steps and actions of the macro eNB, macro UE, MBSFN eNB, and MBSFN UE can be performed by one or more of the layers described above in connection with FIG. 3. For example, mobility procedure for the macro UE 305 can be performed by one or more of the layers 302-312 of the macro UE 305. Mobility procedure by the MBSFN UE 335 can be performed by one or more of the layers 340-350 of the MBSFN UE 335. Mobility state estimation may be performed by the PHY layer and MAC layer of the macro UE 305 and MBSFN UE 335. For another example, configuration of UE mobility parameters may be initiated by the RRC layer 324 of the macro eNB 315 and the RRC layer 336 of the MBSFN eNB 325.

Figure 4:
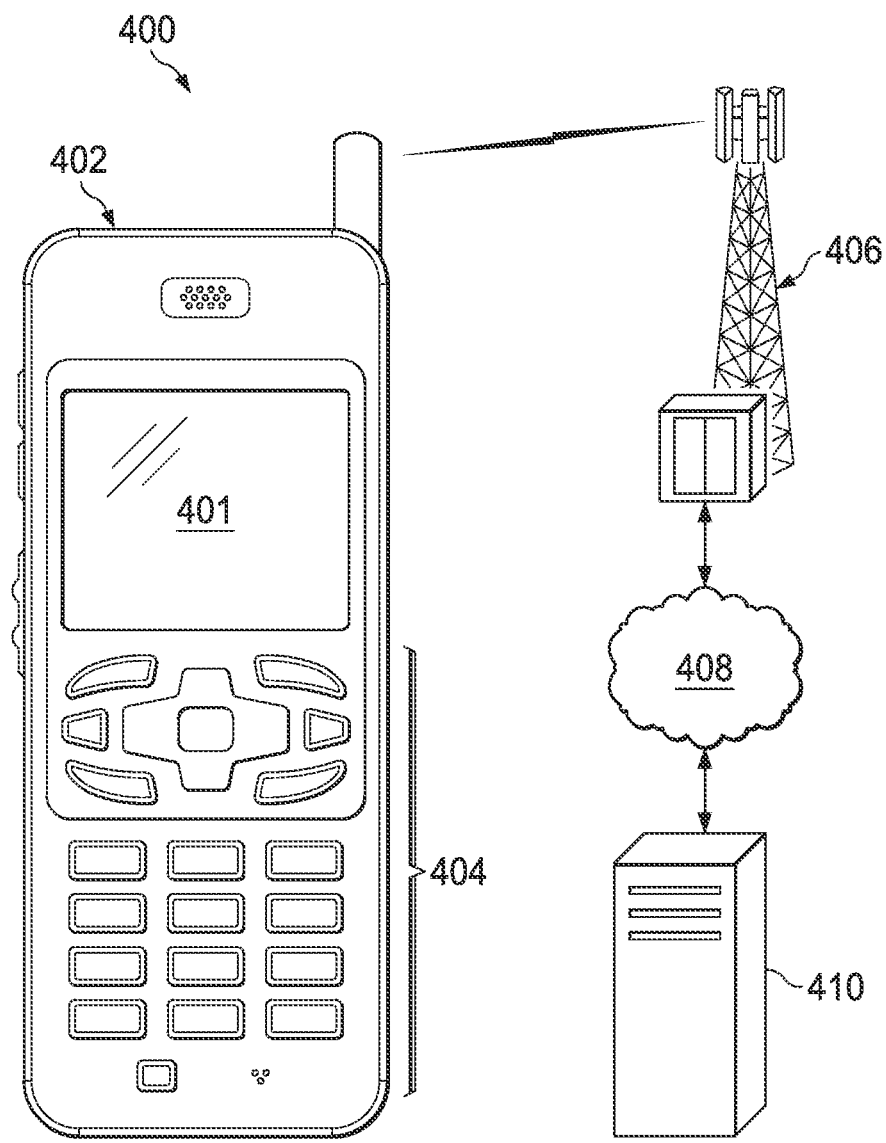
FIG. 4 is a schematic block diagram of a wireless communications system including an example of a mobile device.

FIG. 4 is a schematic block diagram of a wireless communications system 400 including an example of a mobile device 402. The mobile device 402 is operable for implementing aspects of the disclosure, but the disclosure should not be limited to these implementations. The mobile device 402, illustrated as a mobile phone, may take various forms including a wireless handset, a pager, a personal digital assistant (PDA), a portable computer, a tablet computer, or a laptop computer. Many suitable mobile devices may combine some or all of these functions. In some embodiments of the disclosure, the mobile device 402 is not a general purpose computing device like a portable, laptop or tablet computer, but rather is a special-purpose communications device such as a mobile phone, wireless handset, pager, or PDA. In another embodiment, the mobile device 402 may be a portable, laptop or other computing device.

The mobile device 402 includes a display 401. The mobile device 402 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The mobile device 402 may present options for the user to select, controls for the user to actuate, and/or cursors or other indicators for the user to direct. The mobile device 402 may further accept data entry from the user, including numbers to dial or various parameter values for configuring the operation of the mobile device 402. The mobile device 402 may further execute one or more software or firmware applications in response to user commands. These applications may configure the mobile device 402 to perform various customized functions in response to user interaction.

Among the various applications executable by the mobile device 402 are a web browser, which enables the display 400 to show a web page. The web page is obtained via wireless communications with a cell tower 406, a wireless network access node, or any other wireless communication network or system. The cell tower 406 (or wireless network access node) is coupled to a wired network 408, such as the Internet. Via the wireless link and the wired network, the mobile device 402 has access to information on various servers, such as a server 410. The server 410 may provide content that may be shown on the display 400.

Figure 5:
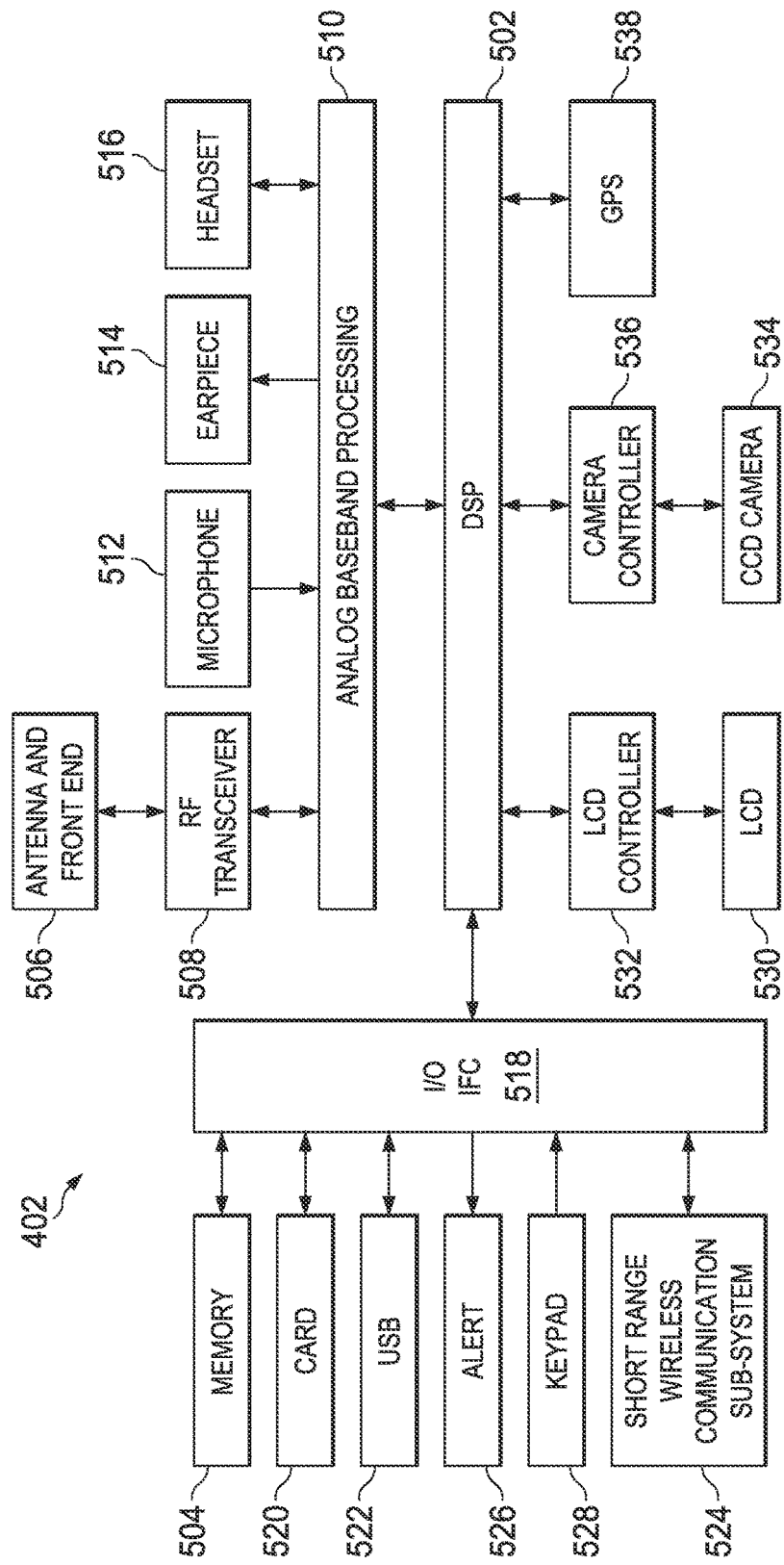
FIG. 5 is a schematic block diagram of the mobile device.

FIG. 5 is a schematic block diagram of the mobile device 402. The mobile device 402 includes a digital signal processor (DSP) 502 and a memory 504. As shown, the mobile device 402 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538.

The DSP 502 or some other form of controller or central processing unit operates to control the various components of the mobile device 402 in accordance with embedded software or firmware stored in memory 504. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 402 to send and receive information from a cellular network or some other available wireless communications network. The RF transceiver 508 provides frequency shifting, converting received RF signals to baseband and converting baseband transmit signals to RF. The analog baseband processing unit 510 may provide channel equalization and signal demodulation to extract information from received signals, may modulate information to create transmit signals, and may provide analog filtering for audio signals. To that end, the analog baseband processing unit 510 may have ports for connecting to the built-in microphone 512 and the earpiece speaker 514 that enable the mobile device 402 to be used as a cell phone. The analog baseband processing unit 510 may further include a port for connecting to a headset or other hands-free microphone and speaker configuration.

The DSP 502 may send and receive digital communications with a wireless network via the analog baseband processing unit 510. In some embodiments, these digital communications may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the mobile device 402 and may also enable the mobile device 402 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the mobile device 402 to communicate wirelessly with other nearby mobile devices and/or wireless base stations.

The input/output interface 518 may further connect the DSP 502 to the alert 526 that, when triggered, causes the mobile device 402 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the mobile device 402. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the mobile device 402 to take digital pictures. The DSP 502 communicates with the CCD camera 534 via the camera controller 536. The GPS sensor 538 is coupled to the DSP 502 to decode global positioning system signals, thereby enabling the mobile device 402 to determine its position. Various other peripherals may also be included to provide additional functions, e.g., radio and television reception.

As mentioned earlier, LTE does not have joining/leaving procedures similar to those in UMTS. This means the network may not have context information about the MBMS services in which the UE is interested, nor information about MBMS services that the UE is actively receiving. When the UE is in RRC Connected mode, the eNB makes handover decisions based on the Measurement Reports from the UE, but without information about the MBMS services that the UE is interested in or actively receiving, the eNB cannot adjust the handover decision to ensure that the UE will be handed over to a target cell where the MBMS service(s) will continue to be available.

Join and leave procedures can be introduced in LTE, similar to UMTS. In this implementation, however, a new MBMS session indication can be added as a separate message or in the measurement report (for UE in RRC Connected mode) to give indication whether the UE is receiving/ interested to receive or not receiving/not interested to receive MBMS session(s) instead of introducing join and leave procedure for LTE.

In the RRC Idle mode, a UE that is interested in continuously receiving an MBMS service selects a target cell based on the MBMS assistance information from the serving cell broadcast channel. The MBMS assistance information guides an idle mode UE to switch to the target cell MBMS frequency and to acquire the BCCH (and MCCH) of a target cell. The SAI, however, only guarantees there will be the same MBMS service but it does not guarantee that the target cell belongs to the same MBSFN area for synchronous MBMS service transmission. For a 'perfect' MBMS service continuity, the UE selects a target cell with the same mbsfn-AreaId obtained from the target cell BCCH's SIB13. For an 'imperfect' MBMS service continuity, the UE selects a target cell with the same TMGI obtained from the MCCH's PMCH-InfoList. The MBMS service continuity requires acquisition of BCCH in target cell and MCCH if the mbsfn-AreaId does not match and 'imperfect' MBMS service continuity is permitted.

In one example, while in RRC Connected mode the UE can add the TMGI(s) that the UE is currently receiving (or interested in receiving) in the measurement report. An example modification of the measurement report by that adds the TMGI(s) of the MBMS service(s) which the UE is receiving or interested in receiving is shown below.

```
MeasResultListEUTRA ::=        SEQUENCE (SIZE (1..maxCellReport)) OF
MeasResultEUTRA
MeasResultEUTRA ::= SEQUENCE {
    physCellId                 PhysCellId,
    cgi-Info                   SEQUENCE {
      cellGlobalId               CellGlobalIdEUTRA,
      trackingAreaCode           TrackingAreaCode,
      plmn-IdentityList          PLMN-IdentityList2        OPTIONAL
    }                                                      OPTIONAL,
```

```
      measResult              SEQUENCE {
        rsrpResult              RSRP-Range           OPTIONAL,
        rsrpResult              RSRQ-Range           OPTIONAL,
        ...,
        [[ additionalSI-Info-r9    AdditionalSI-Info-r9    OPTIONAL
        ]]
      }
    }
}
TMGIs ::=     SEQUENCE (SIZE(1..maxMBMStmgi)) OF tmgi
  tmgi        OCTET STRING (SIZE (5))
  priority    integer (0...1)
```

This can be done for both for UMTS and LTE systems. Each TMGI indicates a multicast bearer that carries one or more MBMS session(s) that correspond to the MBMS service the UE is receiving or interested in continuously receiving. The presence of TMGI(s) indicates whether the UE is receiving or interested in receiving the corresponding MBMS session(s). This assumes that the MME has an up-to-date knowledge of each cell's MBSFN(s)/TMGI(s) under its domain, e.g. from the BM-SC. The TMGI, however, is valid within a PLMN that may span across multiple MBSFN areas, or a TMGI may not be globally unique within one MBSFN area. Therefore TMGI and/or mbsfn-AreaId will be used for an MBMS service within one MBSFN area. For 'perfect' MBMS service continuity, the mbsfn-AreaId is enough because a cell that belongs to the same MBSFN area provides all MBMS service(s) in that MBSFN area. But if an 'imperfect' MBMS service continuity is allowed, the TMGI may be included so that the search goes beyond an MBSFN area boundary.

TMGI is part of MCH (Multicast Channel) configuration within an MBSFN area and a TMGI maps to an MBMS service. In fact the 3rd to the 5th octets of the TMGI is the MBMS service ID. There could be more than one MBMS services in one MCH configuration and each MBMS service corresponds to a unique TMGI. There could be more than one MCH in one MBSFN area. The UE can obtain this information from MCCH in the PMCH-InfoList IE. The TMGI, however is valid within a PLMN that may cross multiple MBSFN Areas.

An MBSFN synchronization area is an area where eNBs are synchronized for MBSFN transmission, and an eNB can only belong to one MBSFN synchronization area on one carrier or frequency layer. An MBSFN synchronization area can support more than one MBSFN areas. It means in a different carrier or frequency layer, an eNB will belongs to a different MBSFN synchronization area, consequently it will be a different MBSFN area. A MBMS service is transmitted in sync within an MBSFN area. In short, it is possible that the two different MBSFN areas are transmitting the same MBMS service in sync or out of sync, with the same TMGI, using similar or different radio properties.

The system embodying principles described herein does not define whether the MBMS service continuity should be 'perfect' or 'imperfect'. If 'perfect' MBMS service continuity is used, the sync is guaranteed to occur only within an MBSFN area, and the mbsfn-AreaId can be used as an indication of the MBMS service to be continued. If 'imperfect' MBMS service continuity is allowed, no sync is required and it can be achieved even when the UE moves to a target cell belongs to a different MBSFN area, as long as the same MBMS service is available. We propose to use TMGI as indication of the MBMS service to be continued. The MBMS service continuity is realized through handover for UE in RRC connected mode and through cell (re) selection for UE in RRC idle mode, to a target cell in the same MBSFN area or to target cell with the same TMGI. If the target cell is in a different MBSFN area, the difference between the MBMS service parameters such as different start time, different frequency, different radio properties, etc. must be acknowledged.

Besides the TMGI or the mbsfn-AreaID that is included in the measurement report sent to by the UE to the serving eNB that may lead to a handover, the UE may also include the priority bit(s) that indicate whether the UE prioritizes the MBMS service or not. For example, UE may set the priority bit to '0' (MBMS is not prioritized) in order to have simultaneous unicast session, or sets the priority bit '1' (MBMS is prioritized) in order to continue MBMS service by handover of the UE to a cell that may not have resources to accommodate the unicast session or provides MBMS service with a signal strength that satisfies the lower MBMS signal strength threshold but may not satisfy the higher unicast signal strength threshold. The MBMS has a low threshold because it can allow for soft combining of the MBMS signal from multiple nodes.

Alternatively, the priority indication may include more than one bit. For example in 2 priority bits, '00' may indicate that no MBMS is requested, while '11' prioritizes MBMS at all costs (i.e., will drop another session if necessary for various reasons such as for an MBMS broadcasting Emergency Service Announcement or ESA). The other bits, i.e. '01' indicate low MBMS priority that can be dropped if necessary for whatever reason (e.g., lack of unicast resources that are simultaneously in session with the MBMS). The bits '10' may indicate high MBMS priority that is preferred to be retained as much as possible.

In some cases, the MBMS carrier is congested and cannot serve a new unicast or other session. The source node will make the best decision in selecting a target cell, based on at least in part on values of congestion bits received by the source node from the candidate nodes and the priority bits received from the UE. The congestion bits from a potential target cell are forwarded to the UE in RRC idle mode. If a UE prioritizes MBMS, the network, through the congestion bits, will indicate to the UE that it should drop the unicast session in order to handover to the MBMS carrier. This indication can be sent in a separate message or can be added in the handover command message. A UE that prioritize MBMS will drop the unicast and handover to the target cell or search for yet another cell that can accommodate both unicast and MBMS.

In some cases, the congestion bit indication can be added as additional assistance information beside the SAI and frequency information in the broadcast. Thus, a UE in RRC Idle mode knows the load condition in MBMS frequency, both in the source node and candidate nodes. When the congestion indication bit indicates that the source node or a target node is congested, an RRC idle UE that prioritizes MBMS may still switch to the MBMS frequency in the target node with understanding that it should not initialize a unicast session until the updated congestion indication in the target node system information indicates it is no longer congested.

An example of a congestion bit in the SIB13 information element is shown below.

```
-- ASN1START
SystemInformationBlockType13-r9 ::= SEQUENCE {
mbsfn-AreaInfoList-r9    MBSFN-AreaInfoList-r9,
SAI                      (this is 3GPP RAN2 stuff),
ARFCN                    (this is 3GPP RAN2 stuff),
CongestionIndication     integer (0..1),
notificationConfig-r9    MBMS-NotificationConfig-r9,
lateNonCriticalExtension OCTET STRING OPTIONAL, -- Need OP
...
}
-- ASN1STOP
```

The eNB will select a cell with strongest signal and has the same MBSFN, as the target cell. In case of multiple mbsfn-AreaId(s)/TMGI(s) that the UE is engaging, the eNB will select a cell with the strongest signal and has same multiple mbsfn-AreaId(s)/TMGI(s), as the target cell. This scheme allows 'perfect' MBMS service continuity.

If none of the returned cell belongs to the same MBSFN area, the eNB may proposed UE to handover to a cell with strongest signal and have the same TMGI or TMGIs (in case the UE is engaging to multiple MBMS service). The eNB may include the starting time, the frequency or carrier, the radio properties, etc. for this 'imperfect' MBMS service continuity. The start time allows the UE to decide whether to continue the MBMS service in target cell or not due to the starting time gap between the serving cell and the candidate cell.

If the MME does not return any cell, there is no neighboring cell that provides the same MBMS service or the same TMGI. The eNB will let the UE knows and it may trigger the UE to initiate a unicast session to deliver the MBMS service via unicast.

There is a possibility that none of the mbsfn-AreaID(s) or TMGI(s) returned in the MBMS Query Ack matches the mbsfn-AreaID(s) or TMGI(s) of the MBMS service that the UE is receiving or interested to receive. In this case, the MBMS service continuity through p-t-m transmission ceased.

The RRC idle UE does not send a new message or a measurement report (with the TMGI(s)/mbsfn-AreaId (s) corresponding to the MBMS service(s) that the UE is receiving or interested to receive). The RRC idle UE will autonomously select a target based on the serving cell's broadcast MBMS assistance information. The cell that has SAI that matches the SAI of the MBMS service that the UE is receiving or interested to receive, with the best signal strength, is selected as the potential target cell. The potential target cell that provides the same MBMS service, however, is not necessarily belongs to the same MBSFN area that guarantees a synchronized MBMS service. Before the UE autonomously select a target cell, we propose the UE to obtain the BCCH and check the mbsfn-AreaId from the SIB 13. If the mbsfn-AreaId matches the serving cell mbsfn-AreaId, the UE select that cell as the target cell for a 'perfect' MBMS service continuation, otherwise the UE obtain the MCCH of this potential target cell to know the TMGI. If the TMGI of this cell matches the TMGI in the serving cell, the UE can select this cell as the target cell for 'imperfect' MBMS service continuation. Alternatively, the UE may select a cell with the second best signal strength as the potential target cell, obtain the BCCH of this cell and check the mbsfn-AreaId from SIB13, follow the same procedure as explained above.

In case there is no matching SAI, MBMS service continuity cannot occur, or the UE change to RRC connected mode and initiate a unicast session to receive the MBMS service via unicast transmission. In another embodiment, the congested indication is added in SAI and frequency information. The RRC Idle UE knows the MBMS frequency load condition in the serving and the target cells. An RRC idle UE that prioritizes MBMS will still switch to the MBMS frequency in the target cell with prior knowledge that it should not initialize a unicast session, until the updated congestion indication in the target cell system information indicates it is no longer congested.

The congestion bits are sent by each candidate node to the source node. These bits can be sent via MME as additional information in a Handover Request ACK over the S1 interface. They can be sent directly from a candidate node as additional information in a Handover Request ACK over the X2 interface, or in a new MBMS Query ACK over X2 interface. An example message sent by the target eNB to inform the MME about the available resources at the target is shown below.

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | ignore |
| eNB UE S1AP ID | M | | 9.2.3.4 | allocated at the target eNB | YES | ignore |
| E-RABs Admitted List | | 1 | | | YES | ignore |
| >E-RABs Admitted Item | | 1 to <maxnoof E-RABs> | | | EACH | ignore |
| >>E-RAB ID | M | | 9.2.1.2 | | — | |
| >>Transport Layer Address | M | | 9.2.2.1 | | — | |
| >>GTP-TEID | M | | 9.2.2.2 | To deliver DL PDUs | — | |

-continued

| IE/Group Name | Presence | Range | IE type and reference | Semantics description | Criticality | Assigned Criticality |
|---|---|---|---|---|---|---|
| >>DL Transport Layer Address | O | | 9.2.2.1 | | | — |
| >>DL GTP-TEID | O | | 9.2.2.2 | To deliver forwarded DL PDCP SDUs. | | — |
| >>UL Transport Layer Address | O | | 9.2.2.1 | | | — |
| >>UL GTP-TEID | O | | 9.2.2.2 | To deliver forwarded UL PDCP SDUs. | | — |
| E-RABs Failed to Setup List | O | | E-RAB List 9.2.1.36 | a value for E-RAB ID shall only be present once in E-RABs Admitted List IE + E-RABs Failed to Setup List IE | YES | ignore |
| Target to Source Transparent Container | M | | 9.2.1.57 | | YES | reject |
| CSG Id | O | | 9.2.1.62 | | YES | ignore |
| Criticality Diagnostics | O | | 9.2.1.21 | | YES | ignore |
| Congestion Indicator | O | | 9.2.1.x | | YES | ignore |

Figure 6:
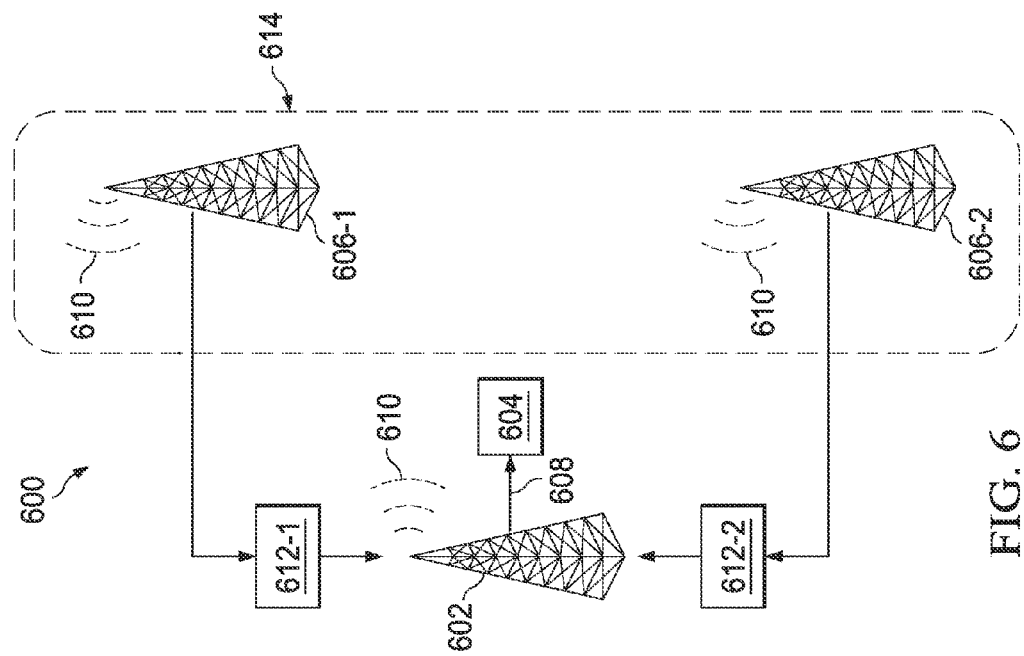
FIG. 6 is a diagram showing an illustrative communication system utilizing priority bits for service continuity.

FIG. 6 is a diagram showing an illustrative communication system 600 utilizing congestion bits 612 for service continuity. According to certain illustrative examples, the communication system 600 includes a source node 602 and a number of candidate nodes 614 which are potential target nodes 606. The source node 602 provides an MBMS signal 610 to at least one UE 604 within range of the source node 602.

According to one illustrative embodiment, the UE 604 is in an RRC idle mode. While in this mode, the UE can still receive an MBMS service from the nearest node. Along with the MBMS data being broadcast, the source node 602 may broadcast MBMS assistance data on the BCCH 608 for that node. The assistance data may include information about neighboring nodes in order to help guide the UE 604 to select another node if the UE 604 roams closer to that other node.

The UE 604 may desire to be selective in choosing which of a set of candidate nodes 614 to select as a target node 606. In the event that the UE 604 switches to an RRC connected mode, the UE 604 may desire unicast or other services. Thus, the UE 604 should determine whether unicast services will be available from the target node 606 before switching to that node. If the UE 604 switches to a target node 606 that is congested and not able to provide unicast services to an additional device, then that UE 604 will not be able to initiate or receive unicast or other services when it switches to RRC connected mode, until the target node is no longer congested.

In order for the source node 602 to determine the target node to which the UE 604 should be directed, the source node 602 can request information from a set of candidate nodes 614 that are within range of the UE 604. Each of the candidate nodes 614 can then respond by transmitting a congestion bit 612. The congestion bit 612 indicates whether or not the candidate node 614 is able to provide unicast services to an additional device such as the UE 604. For example a congestion bit 612 with the value 1 may indicate that the candidate node 614 is congested and cannot provide unicast services to an additional device. Alternatively, a congestion bit 612 with a value of 0 may indicate that the candidate node 614 is not congested and can provide unicast services to an additional device. In some cases, more than one bit may be used to convey different types of congestion statuses. Utilizing the congestion bits 612 received from multiple candidate nodes 614, the source node 602 broadcasts the congestion indication of each candidate node to the UE 604. This congestion indication indicates to the RRC Idle UE 604 which candidate node 614 should be selected to become the target node 606. In one example, the congestion bits can be sent from a candidate node to the source node through an MBMS query response.

According to certain illustrative examples, a UE 604 is in RRC idle mode and within service range of a source node 602. Additionally, the UE 604 is receiving an MBMS from the source node 602. As the UE 604 moves farther away from the source node 602 and towards a set of candidate nodes 614, the UE 604 determines that it should select a different node from which to acquire the MBMS broadcast 610. Sometime after doing so, the UE 604 may establish a connection to the new node when it switches to an RRC connected mode. Thus, the UE may desire to ensure that such unicast or other services will be available before switching to a new node. Typically, the UE 604 will consider only the signal strength to each of the candidate nodes 614 when considering which one to select as a target node 606.

The source node 602 requests congestion bits 612 from each of the candidate nodes 614, for example, through a query. Target node 606-1 sends a congestion bit 612-1 back to the source node. Additionally, target node 606-2 also sends a congestion bit 612-2 back to the source node 602. The source node 602 then broadcasts the value of the congestion bits though the broadcast channel 608 to be used by the UE 604 to make target cell selection. Based on the value of the congestion bits 612, the UE 604 can make a decision as to which of the candidate notes 614 it should select. The UE may also have its own priorities. For example, the UE knows whether it desires non-MBMS services such as unicast services in addition to the MBMS service. Thus, the UE can make a decision as to which candidate node to select based on both the congestion bits and its own priorities.

In this example, target node 606-1 is congested. That is, it cannot provide unicast services to an additional device. In contrast, target node 606-2 is not congested. Thus, it can provide unicast services to an additional device. If the UE 604 will desire unicast services when it switches to RRC connected mode, then the UE 604 may select target node 606-2, even if target node 606-2 has a weaker signal but is still above a certain threshold. If the UE 604 will not desire unicast services when it switches to RRC connected mode, then the UE 604 may select either target node 606 based on other criteria such as signal strength. In some cases, even if the UE 604 does desire unicast services, the UE may select target node 606-1 if the signal strength is sufficiently greater than the signal strength from target node 606-2. In such cases, the UE 604 will just have to wait until unicast services become available on target node 606-1 before being able to utilize unicast service.

Upon selecting a new target node 606, the UE 604 acquires the broadcast control channel from that new target node 606. If the selected target node 606 is on the same single frequency network as the source node 602, then perfect service continuity will occur. If, however, the selected target node 606 is not on the same single frequency network, then imperfect service continuity will occur.

The congestion bits 612 may change over time depending on the status of the node that sends the congestion bits 612. For example, while the node is congested and cannot provide unicast or other services to an additional device, the congestion bits sent from that node will so indicate. As the status of the node changes from being congested to being able to provide services to an additional device, the node will begin to send out congestion bits with different values indicating as such.

Figure 7:
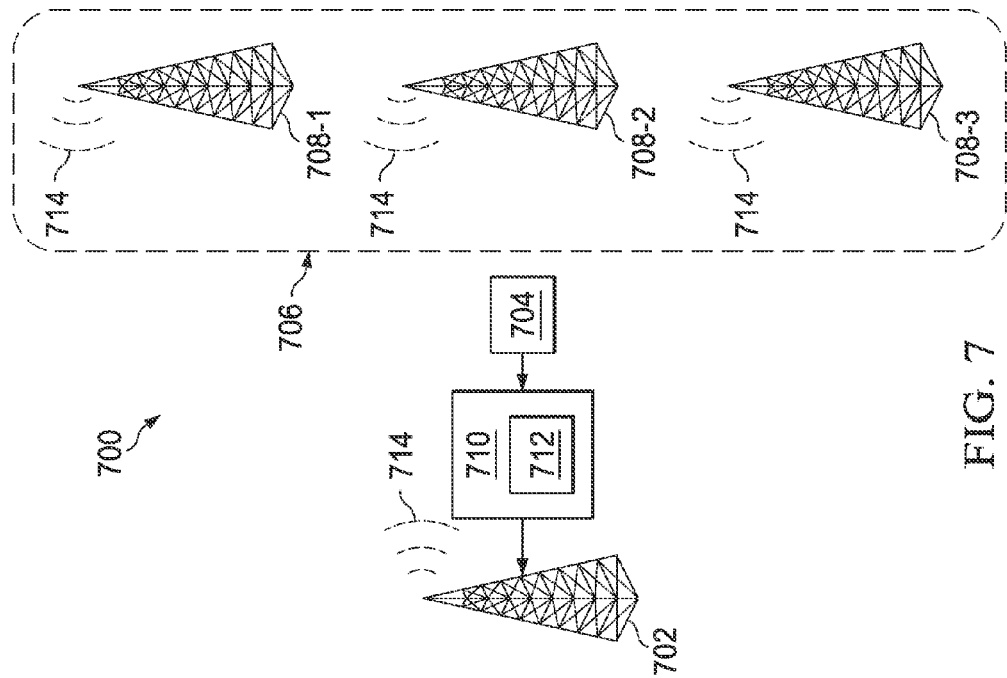
FIG. 7 is a diagram showing an illustrative communication system utilizing congestion bits for service continuity.

FIG. 7 is a diagram showing an illustrative communication system 700 utilizing priority bits 712 for service continuity for a UE in RRC connected mode. According to certain illustrative examples, the communication system 700 includes a source node 702 and a number of candidate nodes 706. Each of the candidate nodes 706 is a potential target node 708. The communication system 700 includes a number of UEs 704 (though, only one is illustrated).

In one embodiment, the source node 700 may be an eNB node within an LTE network. The source node 702 provides a number of UEs within its cell range with a variety of services. Those services include MBMS services 714 to which any of the UEs 704 may be subscribed. In that node, as the UE 704 moves around, it periodically transmits measurement reports to the source node 702 currently service that UE 704. The measurement report indicates the signal strength between the UE 704 and the source node 702 as well as between the UE 704 and a number of other candidate nodes 706. If the signal strength between the UE 704 and at least one of the candidate nodes 706 becomes greater than the signal strength between the UE 704 and the source node 702 by a threshold amount, this triggers the source node 702 to hand off service of the UE 702 to one of the candidate nodes 706.

In a typical case, the source node 702 determines which of the candidate nodes 706 provides the best signal strength to the UE 704 for the selection process. In the case of MBMS, however, the selection process is more complicated.

For example, it may be the case that one of the target nodes 708 is not on the same MBSFN. In such a case, handoff to that target node 708 would be imperfect as the content will not be synchronized. Additionally, it may be the case that even though a target node 708 is on the same MBSFN, the unicast services provided by that target node 708 may be congested. In such case, the UE 704 may experience a perfect transition to the target node 708 for the MBMS service, but would have to drop unicast services for at least a small period of time before unicast services again become available at the target node 708. This is not an issue if the UE 704 does not currently desire unicast services. If the UE 704 does, however, desire unicast services, then it may be preferable to transition the UE 704 to a different target node 708 that may have weaker signal strength, but has unicast services available, as long as the signal is still above a certain threshold.

According to certain illustrative embodiments, a UE 704 in RRC connected mode can indicate to its source node 702 whether or not it prioritizes MBMS through use of a priority bit 712. In one example, when the UE 704 prioritizes MBMS, the priority bit 712 is set to 1. When the UE 704 does not prioritize MBMS, the priority bit 712 is set to 0.

In one example, the UE 704 is in RRC connected mode and is receiving an MBMS service 714 from the source node 702. The UE 704 then approaches the edge of the cell serviced by the source node 702. The UE 704 sends a measurement report indicating that three different candidate nodes 706 have a stronger signal connection to the UE 704 then the source node 702 does, therefore triggering a handoff scenario. The source node 702 then examines the priority bit 712 in order to determine which of the target nodes 708 is best equipped to receive the hand off. The source node 702 also knows the congestion statuses of the candidate nodes based on the congestion bits as described above. If the source node does not have the congestion status of a candidate cell, the source node can query the candidate cell to send its congestion bit, e.g. using MBMS Query and MBMS Query ACK, or through Handover Request and Handover Request ACK In this example, target node 708-3 is of a different single frequency network than the source node 702. In contrast, target nodes 708-1 and 708-2 are broadcasting on the same single frequency network. Target node 708-1 has a stronger signal to the UE 704 than does target node 708-2. Target node 708-1, however, is congested and cannot provide unicast or other services to an additional device. Target node 708-2 is not congested and can still provide unicast or other services to an additional device.

In this scenario, the target node to which the source node 702 hands off the UE 704 depends on the value of the priority bit 712 and the congestion bits. If the value of the priority bit 712 indicates that the UE 704 prioritizes MBMS, then the source node 702 will choose target either target node 708-1 or 708-2 based on other factors such as signal strength.

Alternatively, if the value of the priority bit 712 indicates that the UE 704 does not prioritize MBMS, then it may desire other services such as unicast services from the target node 708. The source node 702 may select either target node 708-2 as the target node because target node 708-2 has available services. Although the signal strength to the UE 704 is not as good to target node 708-2 as it is to target node 708-1, target node 708-2 can provide additional services to the UE 704 if desired, as long as the signal strength of target node 708-2 is still above a certain threshold. The source node provides the congestion bits from the target node to the UE 704. This may be done, for example, through an RRC Reconfiguration message. The UE is thus able to determine whether it needs to drop the unicast and/or other session(s), it can continue some of the unicast and/or the other session(s), or it can continue all the unicast and other session(s) simultaneously with MBMS. Otherwise, it will drop the MBMS session received through multicast.

In some embodiments, the priority bit may be used to indicate that the UE prioritizes another service such as unicast. In such cases, the source node 702 can make decisions based on how the UE prioritizes other services relative to MBMS and guide the UE 704 to select a target node accordingly.

FIG. 8A is a diagram showing an illustrative method 800 for MBMS continuity. According to certain illustrative examples, the method includes, with a source node in a communication system, providing 802 an MBMS, processing 804 an event that indicates that a User Equipment (UE) being serviced by the source node is to be transferred to one of a number of candidate nodes, querying 806 the candidate nodes, receiving 808 a congestion bit from each of the candidate nodes, maintaining 810 the congestion bit from each of the candidate nodes as valid for a predefined period of time, and providing 812 data to the UE that causes the UE to be serviced by a target node selected from the candidate nodes based at least in part on values of the congestion bits from each of the candidate nodes.

It is then determined 814 whether the UE is in an RRC idle mode or an RRC connected mode. If the UE is in idle mode, then the source node provides 816 the UE with the congestion bits over a broadcast control channel associated with the MBMS. If the UE is in connected mode, the method proceeds accordingly as illustrated in FIG. 8B.

Figure 8B:
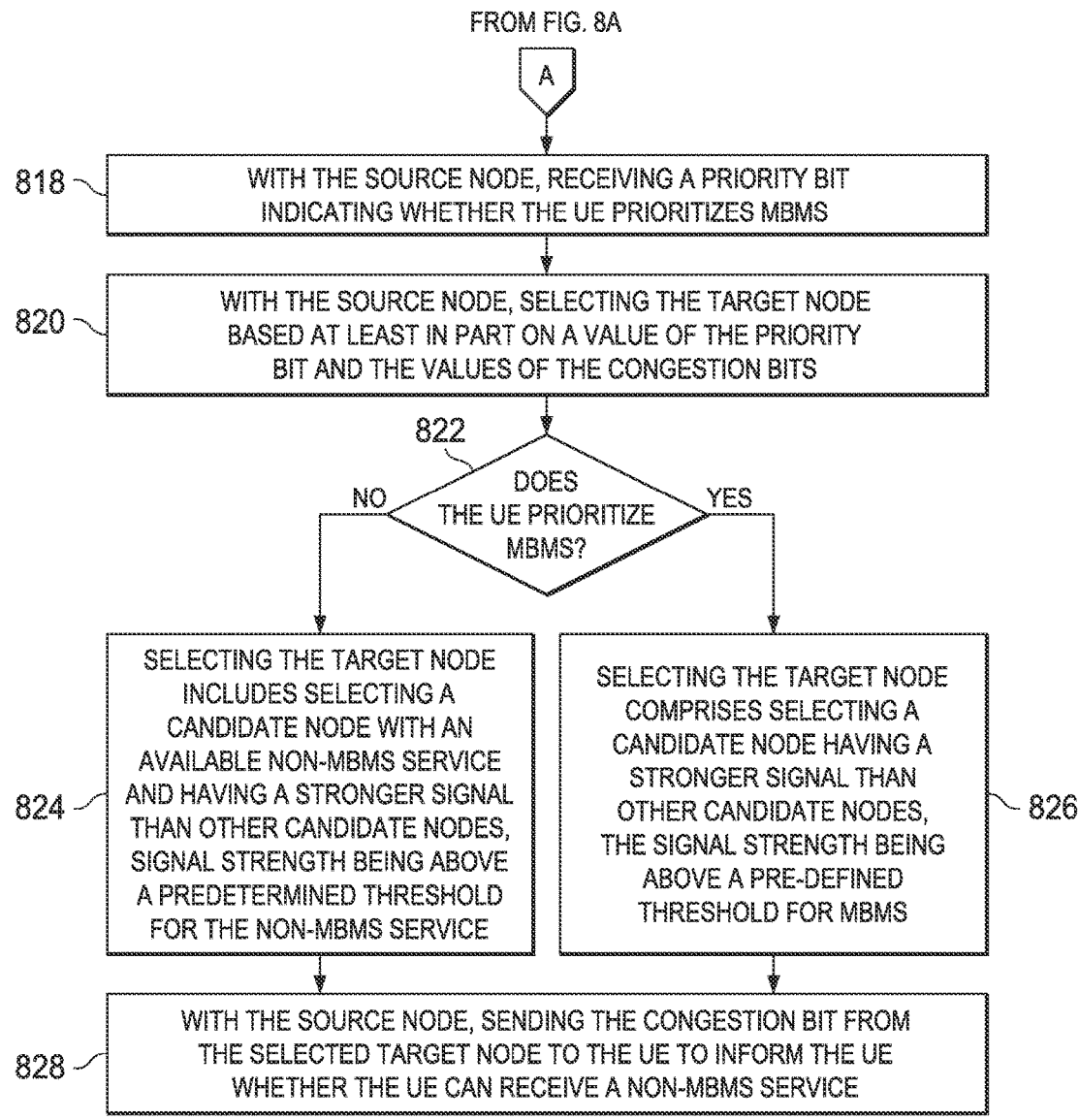
FIG. 8B is a flowchart showing an illustrative method for MBMS continuity, according to one example of principles described herein.

FIG. 8B is a diagram showing an illustrative method 800 for MBMS continuity. According to certain illustrative examples, the method includes receiving 818 a priority bit from the UE, the priority bit indicating whether the UE prioritizes MBMS, and selecting 820 the target node based at least in part on a value of the priority bit and the values of the congestion bits. It is then determined 822 whether the UE prioritizes MBMS.

If the priority bit indicates (822, YES) that the UE prioritizes MBMS, then selecting the target node comprises selecting 826 a candidate node having a stronger signal than other candidate nodes, the signal strength being above a predefined threshold for MBMS. If the priority bit indicates (822, NO) that the UE does not prioritize MBMS, then selecting the target node comprises selecting 824 a candidate node with an available non-MBMS service and stronger signal strength than other candidate nodes, the signal strength being above a predefined threshold for the non-MBMS service. The method further includes, with the source node, sending 828 the congestion bit of the selected target node to the UE to inform the UE whether the UE can receive a non-MBMS service from the target node.

Figure 9:
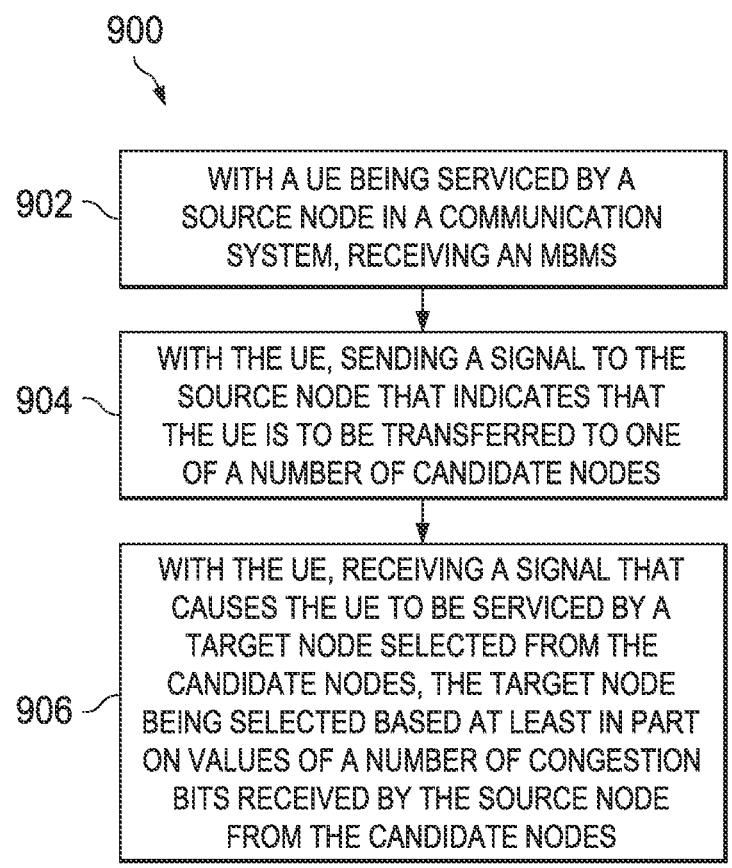
FIG. 9 is a flowchart showing an illustrative method for MBMS continuity, according to one example of principles described herein.

FIG. 9 is a flowchart showing an illustrative method for MBMS continuity. According to certain illustrative examples, the method includes, with a UE being serviced by a source node in a communication system, receiving 902 an MBMS. The method further includes, with the UE, sending 904 a signal to the source node that indicates that the UE is to be transferred to one of a number of candidate nodes, and receiving 906 a signal that causes the UE to be serviced by a target node selected from the candidate nodes, the target node being selected based at least in part on values of a number of congestion bits received by the source node from the candidate nodes.

While this disclosure contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

The features described above and claimed may give rise to one or more advantages. For example, aspects of the present disclosure allow for an electronic device to power a USB HOST MODE peripheral device without the battery of the electronic device sending charge to itself. Further, aspects of the present disclosure provide for multiple charging ports while maintaining a low-cost, compact design that operates relatively quickly and, in some implementations, automatically (i.e., without determinative steps or instructions). The compact design allows for smaller electronic devices and/or more room for other features or circuits.

Other implementations fall within the scope of the following claims.

What is claimed is:

1. A method for managing Multimedia Broadcast Multicast Service (MBMS) service continuity, the method comprising:
   by a source node in a communication system, providing an MBMS;
   by the source node, processing an event that indicates that a User Equipment (UE) being serviced by the source node for MBMS is to be transferred to one of a number of candidate nodes;
   by the source node, receiving a congestion bit from each of the candidate nodes, wherein receiving the congestion bits is in response to a query sent by the source node to the candidate nodes, and at least one of the congestion bits indicates whether a respective candidate node can provide a non-MBMS service to an additional device;
   by the source node, providing data to the UE that causes the UE to be serviced for MBMS by a target node selected from the candidate nodes based at least in part on values of the congestion bits from each of the candidate nodes and whether the UE prioritizes MBMS;
   if the UE is in a Radio Resource Controller (RRC) idle mode:
      by the source node, providing the UE with the congestion bits over a broadcast control channel associated with the MBMS; and wherein the target node is selected at the UE based at least in part on the values of the congestion bits and a priority maintained by the UE that indicates whether the UE prioritizes MBMS; and if the UE is in an RRC connected mode:
by the source node, receiving a priority bit from the UE, the priority bit indicating whether the UE prioritizes MBMS; and
by the source node, selecting the target node based at least in part on a value of the priority bit and the values of the congestion bits.

2. The method of claim 1, wherein the non-MBMS service comprises a unicast service.

3. The method of claim 1, wherein the UE is in a Radio Resource Controller (RRC) idle mode.

4. The method of claim 1, wherein the UE is in an RRC connected mode.

5. The method of claim 4, wherein, if the priority bit indicates that the UE prioritizes MBMS, selecting the target node comprises selecting a candidate node having a stronger signal strength than other candidate nodes, the signal strength being above a predefined threshold for MBMS.

6. The method of claim 4, wherein, if the priority bit indicates that the UE does not prioritize MBMS, selecting the target node comprises selecting a candidate node with an available non-MBMS service and stronger signal strength than other candidate nodes, the signal strength being above a predefined threshold for the non-MBMS service.

7. The method of claim 4, wherein the priority bit is received by the source node in a measurement report sent by the UE.

8. The method of claim 4, wherein the congestion bit is received as part of at least one of: an MBMS query response, a handover command, and a handover request ACK.

9. The method of claim 1, further comprising, by the source node, narrowing the candidate nodes to those that provide the MBMS on a same single frequency network of the source node.

10. The method of claim 1, further comprising, with the source node, sending the congestion bit of the selected target node to the UE to inform the UE whether the UE can receive a non-MBMS service from the target node.

11. The method of claim 10, wherein the congestion bit is sent to the UE in an RRC Connection Reconfiguration message.

12. The method of claim 1, further comprising, with the source node, maintaining the congestion bit from each of the candidate nodes as valid for a predefined period of time.

13. A source node within a communication network, the source node comprising:
a processor; and
a non-transitory computer readable medium comprising a set of computer readable instructions that when executed by the processor, cause the node to:
provide a Multimedia Broadcast Multicast Service (MBMS);
process an event that indicates that a User Equipment (UE) being serviced by the source node for MBMS is to be transferred to one of a number of candidate nodes;
receive a congestion bit from each of the candidate nodes, wherein at least one of the congestion bits from a respective candidate node indicates whether the respective candidate node can provide a non-MBMS service to an additional device;
provide data to the UE that causes the UE to be serviced for MBMS by a target node selected from the candidate nodes based at least in part on values of the congestion bits from each of the candidate nodes and whether the UE prioritizes MBMS, wherein the congestion bits are received as part of at least one of: an MBMS query response, a handover command, and a handover request ACK;

if the UE is in a Radio Resource Controller (RRC) idle mode:
provide the UE with the congestion bits over a broadcast control channel associated with the MBMS; and
wherein the target node is selected at the UE based at least in part on the values of the congestion bits and a priority maintained by the UE that indicates whether the UE prioritizes MBMS; and if the UE is in an RRC connected mode:
receive a priority bit from the UE, the priority bit indicating whether the UE prioritizes MBMS; and
select the target node based at least in part on a value of the priority bit and the values of the congestion bits.

14. The source node of claim 13, wherein the non-MBMS service comprises a unicast service.

15. The source node of claim 13, wherein the UE is in a Radio Resource Controller (RRC) idle mode.

16. The source node of claim 13, wherein the UE is in an RRC connected mode.

17. The source node of claim 16, wherein to select the target node, if the priority bit indicates that the UE prioritizes MBMS, the processor further causes the node to select a candidate node with a stronger signal strength than other candidate nodes, the signal strength being above a predefined threshold for MBMS.

18. The source node of claim 16, wherein to select the target node, if the priority bit indicates that the UE does not prioritize MBMS, the processor further causes the node to select a candidate node with an available non-MBMS service and a stronger signal strength than other candidate nodes, the signal strength being above a predefined threshold for the non-MBMS service.

19. The source node of claim 16, wherein the priority bit is received by the source node in a measurement report sent by the UE.

20. The source node of claim 13, wherein the processor further causes the source node to narrow the candidate nodes to those that provide the MBMS on a same single frequency network of the source node.

21. The source node of claim 13, wherein the processor further causes the source node to send the congestion bit of the selected target node to the UE to inform the UE whether the UE can receive a non-MBMS service from the target node.

22. The source node of claim 21, wherein congestion bit is sent to the UE in an RRC Connection Reconfiguration message.

23. The source node of claim 13, wherein the processor further causes the source node to receive the congestion bits is in response to a query sent by the source node to the candidate nodes.

24. The source node of claim 13, wherein the processor further causes the source node to maintain the congestion bit from each of the candidate nodes as valid for a predefined period of time.

25. A method for managing Multimedia Broadcast Multicast Service (MBMS) service continuity, the method comprising:

by a User Equipment (UE) being serviced by a source node in a communication system, receiving an MBMS;

by the UE, sending a signal to the source node that indicates that the UE is to be transferred to one of a number of candidate nodes; and by the UE, receiving a signal that causes the UE to be serviced for MBMS by a target node selected from the candidate nodes, the target node being selected based at least in part on values of congestion bits received by the source node from the candidate nodes and whether the UE prioritizes MBMS, wherein at least one of the congestion bits indicates whether a respective candidate node can provide a non-MBMS service to an additional device, and the source node maintains the congestion bit from each of the candidate nodes as valid for a predefined period of time;

if the UE is in a Radio Resource Controller (RRC) idle mode:
  receiving the congestion bits from the source node over a broadcast channel; and
  selecting the target node based on at least in part on the values of the congestion bits received by the source node from the candidate nodes and a priority of the UE that indicates whether the UE prioritizes MBMS; and if the UE is in an RRC connected mode:
  sending a priority bit to the source node, the priority bit indicating whether the UE prioritizes MBMS.

26. The method of claim 25, wherein the non-MBMS service comprises a unicast service.

27. The method of claim 25, wherein the UE is in a Radio Resource Controller (RRC) idle mode.

28. The method of claim 25, wherein the UE is in an RRC connected mode.

29. The method of claim 28, wherein, if the priority bit indicates that the UE prioritizes MBMS, selecting the target node comprises selecting a candidate node with a stronger signal strength than other candidate nodes, the signal strength being above a predefined threshold for MBMS.

30. The method of claim 28, wherein, if the priority bit indicates that the UE does not prioritize MBMS, selecting the target node comprises selecting a candidate node with an available non-MBMS service and having a stronger signal strength than other candidate nodes, the signal strength being above a predefined threshold for the non-MBMS service.

31. The method of claim 28, wherein the priority bit is received by the source node in a measurement report sent by the UE.

32. The method of claim 28, further comprising, with the UE, receiving the congestion bit of the selected target node to determine whether the UE can receive a non-MBMS service from the target node.

33. The method of claim 32, wherein congestion bit is received by the UE in an RRC Connection Reconfiguration message.

34. The method of claim 25, wherein the congestion bit is received by the source node as part of at least one of: an MBMS query response, a handover command, and a handover request ACK.

35. The method of claim 25, wherein the candidate nodes have been narrowed by the source node to those that provide the MBMS on a same single frequency network of the source node.

36. The method of claim 25, wherein the source node receives the congestion bits in response to a query sent by the source node to the candidate nodes.

37. A User Equipment (UE) being serviced by a source node within a communication network, the UE comprising:
  a processor; and
  a non-transitory computer readable medium comprising a set of computer readable instructions that when executed by the processor, cause the UE to:
    receive an MBMS;
    send a signal to the source node that indicates that the UE is to be transferred to one of a number of candidate nodes; and
    receive a signal that causes the UE to be serviced for MBMS by a target node selected from the candidate nodes, the target node being selected based at least in part on values of congestion bits received by the source node from the candidate nodes and whether the UE prioritizes MBMS, wherein at least one of the congestion bits indicates whether a respective candidate node can provide a non-MBMS service to an additional device, and the candidate nodes have been narrowed by the source node to those that provide the MBMS on a same single frequency network of the source node;
  if the UE is in a Radio Resource Controller (RRC) idle mode:
    receive the congestion bits from the source node over a broadcast channel; and
    select the target node based on at least in part on the values of the congestion bits received by the source node from the candidate nodes and a priority of the UE that indicates whether the UE prioritizes MBMS; and
  if the UE is in an RRC connected mode:
    send a priority bit to the source node, the priority bit indicating whether the UE prioritizes MBMS.

38. The UE of claim 37, wherein the non-MBMS service comprises a unicast service.

39. The UE of claim 37, wherein the UE is in a Radio Resource Controller (RRC) idle mode.

40. The UE of claim 37, wherein the UE is in an RRC connected mode.

41. The UE of claim 40, wherein to select the target node, if the priority bit indicates that the UE prioritizes MBMS, the source node selects a candidate node with a stronger signal strength than other candidate nodes, the signal strength being above a predefined threshold for MBMS.

42. The UE of claim 40, wherein to select target node, if the priority bit indicates that the UE does not prioritize MBMS, the source node selects a candidate node with an available non-MBMS service and having a stronger signal strength than other candidate nodes, the signal strength being above a predefined threshold for the non-MBMS service.

43. The UE of claim 40, wherein the priority bit is received by the source node in a measurement report sent by the UE.

44. The UE of claim 40, wherein the computer readable instructions are further configured to cause the UE to receive the congestion bit of the selected target node to allow the UE to determine whether the UE can receive a non-MBMS service from the target node.

45. The UE of claim 44, wherein congestion bit is received by the UE in an RRC Connection Reconfiguration message.

46. The UE of claim 37, wherein the congestion bit is received by the source node as part of at least one of: an MBMS query response, a handover command, and a handover request ACK.

47. The UE of claim 37, wherein the source node receives the congestion bits in response to a query sent by the source node to the candidate nodes.

48. The UE of claim 37, wherein the source node maintains the congestion bit from each of the candidate nodes as valid for a predefined period of time.

* * * * *